US009788555B2

(12) United States Patent
Van Oss et al.

(10) Patent No.: US 9,788,555 B2
(45) Date of Patent: Oct. 17, 2017

(54) METHOD AND DEVICE FOR EVISCERATION OF SLAUGHTERED POULTRY

(71) Applicant: MAREL STORK POULTRY PROCESSING B.V., Boxmeer (NL)

(72) Inventors: Maarten Leonardus Van Oss, Heumen (NL); Bastiaan Wilhelmina Johannes Elizeus Josephus Drabbels, Vierlingsbeek (NL); Roger Pierre Hubertus Maria Claessens, Nijmegen (NL); Marc Johan Halfman, Zeddam (NL)

(73) Assignee: MAREL STORK POULTRY PROCESSING B.V., Boxmeer (NL)

( * ) Notice: Subject to any disclaimer, the term of this patent is extended or adjusted under 35 U.S.C. 154(b) by 0 days.

(21) Appl. No.: 15/328,361

(22) PCT Filed: Jul. 20, 2015

(86) PCT No.: PCT/NL2015/050529
§ 371 (c)(1),
(2) Date: Jan. 23, 2017

(87) PCT Pub. No.: WO2016/013931
PCT Pub. Date: Jan. 28, 2016

(65) Prior Publication Data
US 2017/0215440 A1    Aug. 3, 2017

(30) Foreign Application Priority Data

Jul. 24, 2014    (NL) .................................... 2013250

(51) Int. Cl.
*A22C 21/00*    (2006.01)
*A22C 21/06*    (2006.01)

(52) U.S. Cl.
CPC .................................... *A22C 21/06* (2013.01)

(58) Field of Classification Search
CPC ........ A22C 21/00; A22C 21/06; A22C 21/066
(Continued)

(56) References Cited

U.S. PATENT DOCUMENTS

| 3,798,708 A | 3/1974 | Scheier |
| 3,879,803 A | 4/1975 | Verbakel |

(Continued)

FOREIGN PATENT DOCUMENTS

| DE | 37 09 869 A1 | 10/1988 |
| EP | 0 587 253 A2 | 3/1994 |

(Continued)

*Primary Examiner* — Richard Price, Jr.
(74) *Attorney, Agent, or Firm* — Birch, Stewart, Kolasch & Birch, LLP

(57) ABSTRACT

A method for eviscerating slaughtered poultry having a carcass with a viscera pack in a body cavity of the carcass, includes entering the body cavity of the retained carcass with an eviscerating tool via an opened vent end, passing a front end of the eviscerating tool along the breast side of the body cavity so that the front end thereof moves past the viscera pack at least till beyond the liver, using a gizzard pre-lifting tool, which is entered into the body cavity of the retained carcass via the opened vent end, which gizzard pre-lifting tool is operated to grasp the gizzard and/or belly fat bonded to the gizzard and is operated to lift the gizzard thereby entraining a further portion of the viscera pack, the lifting of the gizzard being performed prior to the front end of the eviscerating tool passing along the breast side.

20 Claims, 9 Drawing Sheets

(58) Field of Classification Search
USPC .......................... 452/106, 111–114, 120, 123
See application file for complete search history.

(56) References Cited

U.S. PATENT DOCUMENTS

| | | | |
|---|---|---|---|
| 4,019,222 A * | 4/1977 | Scheier | A22C 21/06 |
| | | | 452/117 |
| 5,186,679 A | 2/1993 | Meyn | |
| 5,707,280 A * | 1/1998 | Tieleman | A22C 21/06 |
| | | | 452/117 |
| 6,328,645 B1 | 12/2001 | Martin et al. | |
| 2014/0256241 A1 * | 9/2014 | Drabbels | A22C 21/0046 |
| | | | 452/116 |

FOREIGN PATENT DOCUMENTS

| | | |
|---|---|---|
| EP | 1 011 341 A1 | 6/2000 |
| EP | 1 493 335 A1 | 1/2005 |
| WO | WO 97/25872 A2 | 7/1997 |
| WO | WO 98/44806 A1 | 10/1998 |
| WO | WO 01/52659 A1 | 7/2001 |

* cited by examiner

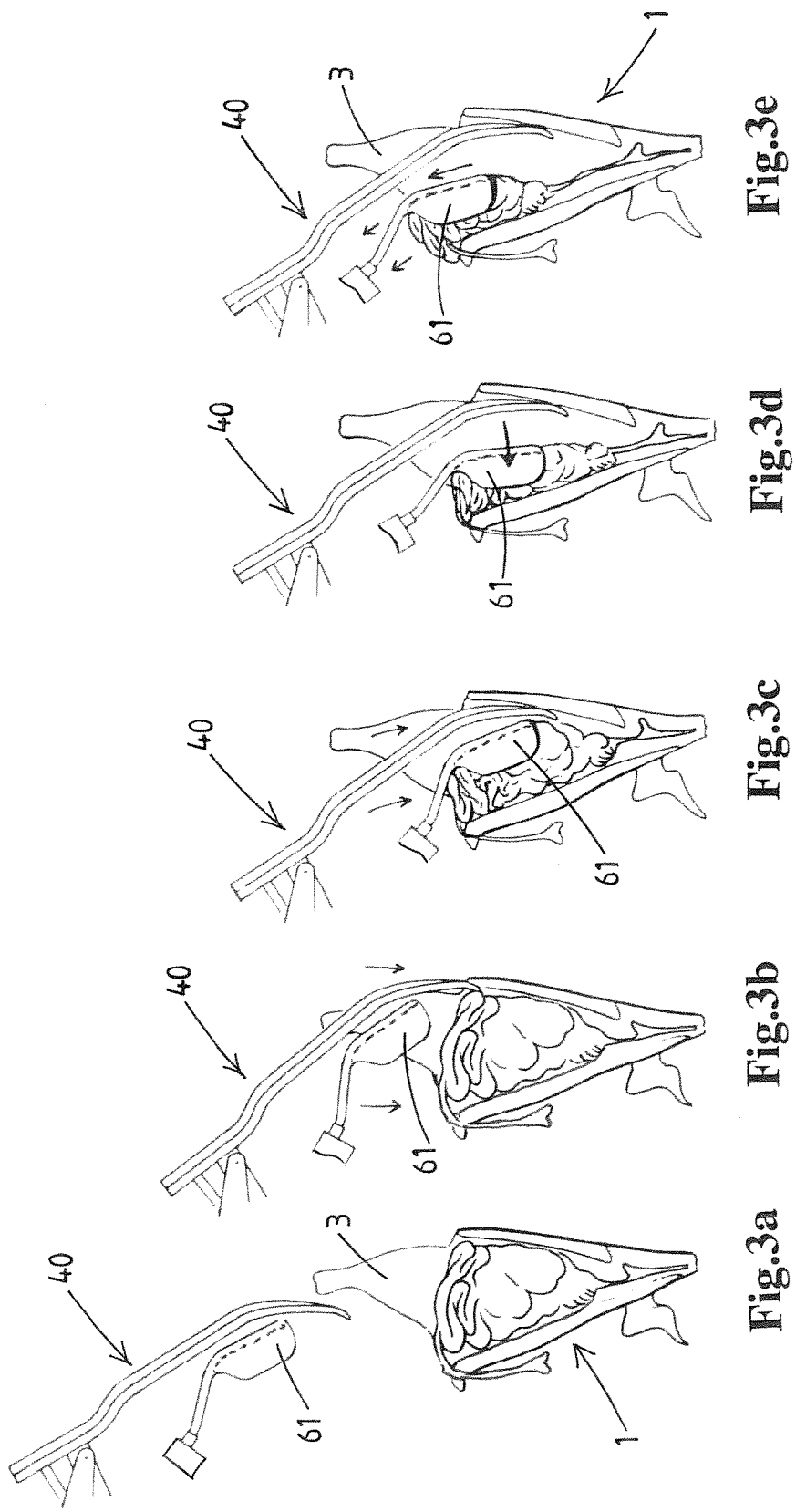

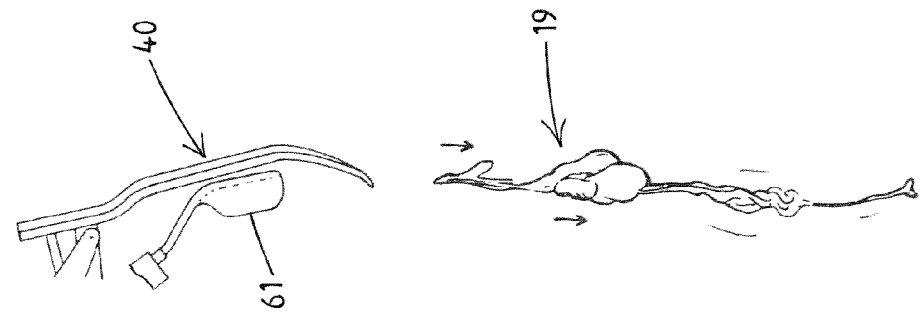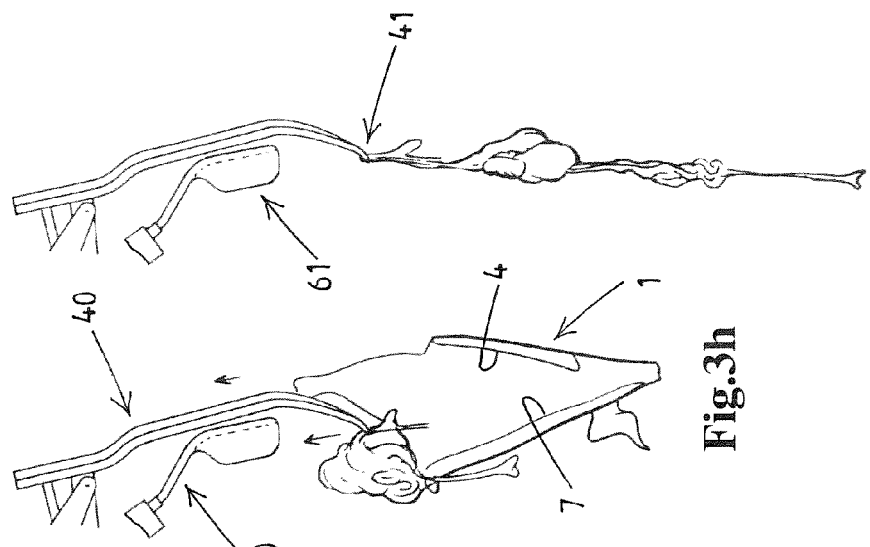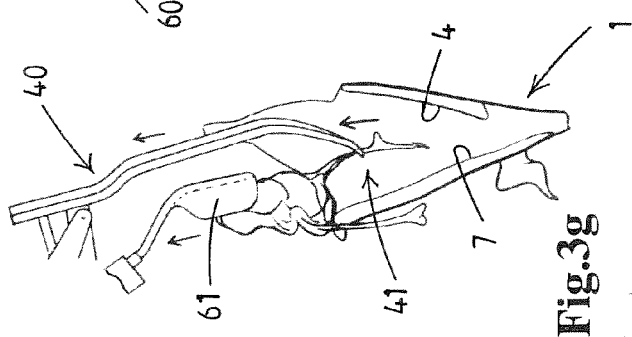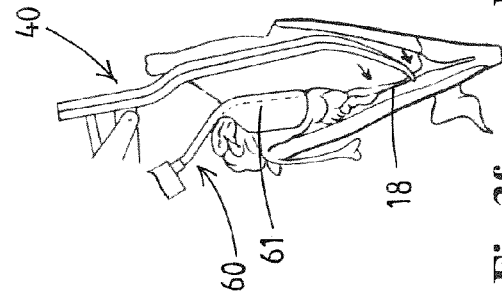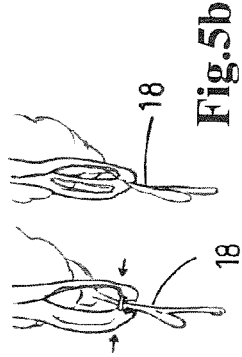

METHOD AND DEVICE FOR EVISCERATION OF SLAUGHTERED POULTRY

TECHNICAL FIELD

In poultry processing plants slaughtered and defeathered poultry is conveyed to an evisceration device which removes the viscera pack from the body cavity of the carcass. Commonly the body cavity is opened at the vent end, which vent end opening is made by a separate vent end opening device upstream of the evisceration device or a vent end opening device that is integrated with the evisceration device.

In many common evisceration methods the carcass is retained in an orientation with the neck end downwards, e.g. in an approximately vertical orientation or retained in a tilted orientation. This neck end downward orientation is more practical than an orientation wherein the vent side is oriented downward. The latter orientation causes, or may cause, the viscera pack (or a portion thereof) to spill uncontrolled from the body cavity which is not, or hardly, the case when the neck downward orientation is used. Also the vent end downward orientation requires a rather complex retention structure of the evisceration device as the carcasses are commonly conveyed hanging from their legs. An example of a vent end downward orientation is e.g. found in U.S. Pat. No. 6,328,645.

In common evisceration methods an eviscerating tool is entered into the body cavity of the retained carcass via the opened vent end. The eviscerating tool is dipped deeper into the body cavity in a path along the breast side of the body cavity so that the front end thereof passes the viscera pack at least till beyond the liver, commonly till below the heart, e.g. to clamp the gullet close to the neck end by means of a clamp at the front end of the eviscerating tool if present. Then the eviscerating tool is withdrawn and thereby the viscera pack is lifted out of the body cavity.

An early example of an evisceration device for automated removal of the viscera pack is disclosed in U.S. Pat. No. 3,798,708. Herein an evisceration tool is dipped into the body cavity and passed in an arc along the breast side of the body cavity to avoid damage to internal organs. With reference to FIGS. 15 and 16 therein an evisceration tool is disclosed embodied as a loop having parallel legs connected by a bight forming the front end of the tool.

The eviscerating tool is dipped into the body cavity until the bight reaches the lungs, which are deep in the cavity close to the neck end. Then the eviscerating tool is withdrawn along the backbone and in this process the gizzard and the rest of the viscera pack is trapped between the legs of the tool. The further withdrawal causes the entire viscera pack to be removed from the body cavity.

In U.S. Pat. No. 4,019,222 assigned to the same assignee as U.S. Pat. No. 3,798,708 the eviscerating device, in addition to the looped eviscerating tool, is provided with a tool to grab the proventriculus. The looped eviscerating tool is dipped deep into the body cavity along the breast side to reach under most of the organs and is then moved towards the back. In the withdrawal motion of the eviscerating tool the bight of the loop is pulled upwards to arrive at the bottom of the gizzard. The loop is then held stationary whilst the proventriculus tool is passed along the back of the body cavity to reach below the proventriculus. Then the tongue of this tool is cocked and in the upward motion this tongue seat against the proventriculus. This is followed by simultaneous withdrawal of both tools from the body cavity.

Another prior art example of poultry eviscerating is disclosed in U.S. Pat. No. 3,879,803. Herein a first step of the process involves the introduction of a spatula and an evisceration tool in an arced path into the body cavity. In the initial phase of the introduction the spatula is advanced ahead of the evisceration tool. The spatula passes the gizzard and separates the liver and the heart from the breast side and then is moved backwards. The evisceration tool is then dipped deeper into the body cavity and tilted towards the back of the carcass so that the front end of the evisceration tool engages on the gullet. Then the tool is withdrawn so that the viscera pack is removed from the body cavity. U.S. Pat. No. 3,879,803 specifically discloses that one of the advantages achieved with this approach is the reduction of liver damage.

The fresh liver is a rather fragile organ that is easily damaged. As undamaged livers have a significant financial value, the reduction of such damage is of importance in the poultry meat industry. In general damaged livers are used as pet food ingredient and the like, whereas undamaged livers are marketed as food for human consumption.

In U.S. Pat. No. 5,186,679 an eviscerating tool is disclosed having C-shaped braces. The front or lower ends of these braces are dipped into the body cavity along the breast side till the region of the lungs. These ends are embodied to form a clamp for the gullet close the neck end of the poultry carcass. The issue of preventing liver damage is also addressed in U.S. Pat. No. 5,186,679. Damage is avoided by only moving the C-shaped braces to their clamping position once the braces have passed the liver.

Another eviscerating method and device is disclosed in WO97/25872. Here the eviscerating tool is dipped into the body cavity along the breast side and continues down until the front end presses the gullet against the back wall of the body cavity. This device is provided with an additional tool to loosen the crop, which tool has been introduced via the neck end of the carcass.

In WO01/52659 an eviscerating tool is disclosed with one or more movable clamping jaws at the front end thereof. The tool is dipped into the body cavity along the breast side until the front end reaches the gullet below the heart.

A further example of existing eviscerating methods and devices is EP 1 011 341 wherein the eviscerating tool comprises both a spoon member and a grabber member. The latter is embodied to grasp the gullet. The spoon member is movable relative to the grabber member to accomplish a desired motion sequence in the evisceration process.

In EP 1 493 335 a belly fat retention device is disclosed which performs an operation on the opened poultry carcass prior to the carcass being conveyed onward to an evisceration device. The belly fat retention device employs a scraping tool that is introduced into the body cavity of a carcass. The scraping tool first is dipped into the body cavity and then performs an upward motion such that a scraping action along the gizzard is performed whereby the bond between the gizzard and belly fat is broken. To prevent the gizzard and belly fat from being entrained in this upward scraping motion, and thereby removed from the body cavity, a centring brace is proposed so that these parts remain within the body cavity.

The prior art evisceration methods and devices are found to be unsatisfactory in view of the damage done to the livers. At present day operating speeds of eviscerating devices are very high and losses due to damage of harvested livers are witnessed in the range between 30 and 60 percent.

It is therefore an object of the present invention to propose measures that allow for a reduction of liver damage in the evisceration process.

It is a further object of the present invention to propose such measures that may be readily combined with existing and currently widely used evisceration tools that are moved along the breast side of the body cavity, past the liver, during the dipping step, e.g. as disclosed in U.S. Pat. No. 5,186,679, WO97/25872, WO01/52659, and EP 1 011 341.

SUMMARY OF THE INVENTION

The invention provides an eviscerating method which is characterized in that use is made of a gizzard pre-lifting tool, distinct from the eviscerating tool, which is entered into the body cavity of the retained carcass via the opened vent end, which gizzard pre-lifting tool is operated to grasp the gizzard and/or belly fat bonded to the gizzard and which gizzard pre-lifting tool is operated to lift the gizzard thereby entraining a further portion, including the liver, of the viscera pack, said lifting of the gizzard being performed prior to the front end of the eviscerating tool passing along the breast side of the body cavity past the liver as the eviscerating tool is dipped into the body cavity.

It has been found that the grasping and pre-lifting of the gizzard by said dedicated gizzard pre-lifting tool, by grasping the gizzard itself and/or belly fat bonded thereto, entrains a further portion of the viscera pack which further portion also includes the liver, which facilitates the later passage of the eviscerating tool along the breast side past the liver without causing detrimental damage to the liver. An explanation is that, with the carcass in neck down orientation and the vent end opened, the viscera pack effectively sinks down into the body cavity due, with the neck side of the body cavity effectively having the shape of a downwardly narrowing funnel. By dedicated grasping and lifting the gizzard and the entrained portion, including the liver, of the viscera pack this "sinking down effect" is—at least in part—compensated, whereby the eviscerating tool can then later be passed down along the breast side deep into the body cavity with more ease and less, if any, resistance from or contact with the viscera. In particular it is found that the fragile liver, located at the breast side of the viscera pack, benefits from this approach as a noticeable reduction of liver damage is witnessed. Also less damage to the heart may result from this approach.

The inventive approach is considered of particular advantage in a device wherein the eviscerating tool performs, towards the end of the dipping motion along the breast side or thereafter, a grabbing motion to grab the gullet below the heart, e.g. with the entire eviscerating tool or the front end or other part thereof, e.g. a mobile front end, being moved, e.g. by tilting the entire tool, towards the gullet, e.g. towards the back of the carcass. As explained above such methods and devices are known in the art. Due to the prior dedicated pre-lifting of the gizzard and entrained portion of the viscera pack this grabbing motion by the evisceration tool does not, or only in limited manner, cause undue compression of the region of the liver and heart of the viscera pack and thereby a reduced likelihood of damage of the liver and/or one or more other organs is achieved.

The invention is primarily proposed for the evisceration of chicken but other poultry, e.g. duck, is also envisaged.

The invention proposes to lift the gizzard by grasping the gizzard itself and/or belly fat bonded to the gizzard. The gizzard is a strong organ which can be effectively targeted by the pre-lifting tool. Due to its inherent strength the gizzard cannot be damage easily. This approach may, in embodiments, allow for a rather firm grasp which can be performed at the high speeds currently common in automated poultry evisceration.

In practical embodiments the gizzard may be covered by some of the intestines when seen from above into the opened vent end of the body cavity. When the pre-lifting tool is introduced into the body cavity to reach the gizzard, the intestines are easily displaced by the tool due to their flexibility and the intestines will remain intact thereby avoiding undesirable spillage of digestive material.

As the gizzard pre-lifting tool is dedicated to grasping and lifting the gizzard, the introduction thereof into the body cavity is to a shallow depth, less than the maximum dipping depth of the eviscerating tool. The introduction of the pre-lifting tool can be performed such that the gizzard pre-lifting tool stays clear of the liver and does not pass along the liver in order to avoid damaging the liver. For example the pre-lifting tool is introduced to move with a front end thereof to a depth between the gizzard and the liver, e.g. moving to the level of or just past the bottom of the gizzard when considered in the neck down orientation of the carcass. In an embodiment the gizzard pre-lifting tool is operated to lift the gizzard and also to displace the gizzard away from the breast of the carcass, e.g. to a position at the back of the carcass. By moving the gizzard towards or to the back of the carcass it is envisaged that the dipping of the eviscerating tool along the breast side past the viscera pack, including past the liver, preferably also past the heart, is further facilitated and a further reduction of damage to the liver ensues.

The pre-lifting of the gizzard may be done such that the pre-lifted gizzard is still within the body cavity, so not moved out of the body cavity, e.g. with some of the intestines on top of the gizzard being moved out of the body cavity. In an embodiment the pre-lifting is done such that the gizzard is fully out of the body cavity.

In an embodiment, during the withdrawal of the eviscerating tool, the gizzard pre-lifting tool is moved in a withdrawal motion along with the eviscerating tool thereby further lifting the gizzard and entrained portion of the viscera pack. This approach may cause an advantageous reduction of the strain placed on the viscera pack during the withdrawal, which may benefit the integrity of one or more organs in the viscera pack other than the liver, e.g. the heart, the proventriculus, etc., thereby further enhancing the yield of the viscera in view of harvestable organs. It may also allow for an increase of evisceration speed due the viscera pack being reliably engaged at two locations, e.g. when the front end of the evisceration tool is provided with or embodied as a clamp that clamps the gullet. Another advantage of this approach may be that the gizzard is retained by the pre-lifting tool in a predetermined position when withdrawn from the body cavity, which may be advantageous in view of a possible transfer of the viscera pack to a downstream viscera pack conveyor, e.g. a viscera pack conveyor leading to an inspection station where the viscera are inspected. For example the pre-lifting tool is embodied and operated to maintain the grasp of the gizzard and/or belly fat bonded to the gizzard during the withdrawal motion.

In an embodiment—as is known from various prior art devices—the front end of the eviscerating tool grasps the gullet before withdrawing the eviscerating tool, e.g. wherein the front end of the eviscerating tool is provided with a gullet clamp, e.g. having one or more movable gullet clamp jaws. This may be advantageous in view of the complete removal of the viscera pack.

In a practical embodiment the gizzard pre-lifting tool comprises a gizzard spoon that is embodied to capture the gizzard. The gizzard spoon is entered into the body cavity at the breast side of the gizzard and is then moved towards the back of the body cavity and lifted to capture and lift the gizzard, thereby entraining the further portion of the viscera pack, said further portion including the liver. The spoon is preferably embodied as a rigid member that is shaped so as to capture the gizzard. This allows to dispense with any mobile parts on the pre-lifting tool, e.g. to dispense with any clamp or the like, which allows for a simple structure and high operating speed. The spoon may, e.g. have a dimension and shape rather similar to an ordinary table spoon. If desired the spoon may have one or more openings in the surface of the spoon, e.g. a central opening so that the spoon effectively forms a loop shaped spoon.

In an embodiment the gizzard pre-lifting tool comprises a clamp that is operated to clamp the gizzard and/or belly fat bonded to the gizzard.

Instead of a spoon or a clamp the pre-lifting tool could also be embodied to grasp the gizzard and/or bonded belly fat in a different manner. For example the pre-lifting tool could be embodied as a bracket with a loop that is slung underneath the gizzard and/or bonded belly fat, a hook or spear that engages the gizzard and/or bonded belly fat, a suction device that captures the gizzard and/or bonded belly fat by suction, etc.

In a practical embodiment the gizzard pre-lifting tool comprises a clamp and the clamp of the gizzard pre-lifting tool comprises a left-hand clamp member and a right-hand clamp member, each clamp member having a front end. These clamp members are entered into the body cavity along the side of the gizzard facing the breast of the carcass and, preferably, to a depth wherein their front ends have passed beyond the gizzard, e.g. to just below the gizzard. Once introduced to a suitable depth to perform the grasping, e.g. at the height of the bottom of the gizzard, the left-hand clamp member is passed along the left-hand side of the gizzard and the right-hand clamp member along the right-hand side, when seen from above, towards the back of the carcass into a clamping position relative to the gizzard. If desired these passing motions can be combined with some vertical motion of the pre-lifting tool. In this clamping position the clamp members have been moved towards one another such that the back portion of the gizzard and/or belly fat bonded to the gizzard is clamped between the clamp members. Then the pre-lifting tool is operated to lift the gizzard as explained herein.

In a practical embodiment the clamp members of the pre-lifting tool are spaced from one another in the clamping position such that belly fat bonded to the gizzard is clamped while the spacing allows for the undamaged passage of intestines between the clamp members in the clamping position. This avoids or reduces the risk that the clamping causes the rupture of any intestines.

The use of a gizzard pre-lifting tool may, in a suitable design and operation of the tool, also be employed to cause belly fat bonded to the gizzard to become loosened from the gizzard to which it is naturally rather strongly bonded. This loosening, e.g. by locally tearing belly fat close to the gizzard and/or tearing the bond with the gizzard, may be deliberately caused during the process of grasping of the gizzard, e.g. as the clamp members are being passed along opposite sides of the gizzard.

The loosening may also be achieved, or progressed, by passing members of the pre-lifting tool along opposite sides of the gizzard from the breast facing side thereof to the back facing side thereof, followed by the pinching of belly fat by means of these members at the back side of the gizzard so that it is strained and will rupture and/or release from the gizzard. This pinching effect of the belly fat can be achieved, if desired, after the pre-lifting step of the gizzard, or even after the step of withdrawal of the viscera pack from the body cavity by means of both the pre-lifting tool and the evisceration tool.

In an embodiment it is envisaged that the pre-lifting tool is embodied to maintain a grasp on the gizzard or bonded belly fat after the pre-lifting step, wherein in a further step a pulling action is performed wherein the belly fat is strained and will rupture and/or become loose from the gizzard. For example the pre-lifting tool is embodied to pinch belly fat bonded to the gizzard and the gizzard is then pulled away so that the desired loosening of belly fat from the gizzard is achieved. For example use is made of an additional gizzard stop member, with the pre-lifting tool performing a motion relative to said gizzard stop member so that the gizzard is withheld by said stop member and thus the mentioned pull action is performed. For example the stop member is arranged in mobile manner, so as to be movable between a retracted position and an active position. In another embodiment the gizzard stop member is formed on or by the evisceration tool, e.g. by the front end of the evisceration tool, wherein said front end is used to pressed the gizzard away from the pre-lifting tool that retains the belly fat.

One can also envisage that the pre-lifting tool retains its grasp of the gizzard after pre-lifting and brings the gizzard in the vicinity of a belly fat cutter that cuts into or through the belly fat, preferably adjacent the gizzard so as to retain as much belly fat on the carcass as possible.

In an embodiment the gizzard pre-lifting tool comprises a mobile member, e.g. one or more movable clamp members as explained above, that is/are moved, e.g. in a scraping action, past the exterior of the gizzard during the grasping of the gizzard, e.g. during a motion of clamp members towards a clamping position thereof. For example, the use of a gizzard pre-lifting tool with one or more clamp members that are moved past the gizzard during motion thereof towards a clamping position, e.g. with the clamp members being located at the back side of the gizzard in said clamping position, may be employed to have the effect that the forces exerted by the clamp member(s) during said motion on belly fat bonded to the gizzard cause said belly fat to become loosened from the gizzard and/or torn. This effectively weakens the connection of the gizzard to the carcass which may be beneficial during the later withdrawal of the viscera pack from the body cavity, e.g. in view of strain placed on the viscera pack and/or in view of yield as the belly fat then remains connected to the carcass and thus adds to the carcass weight.

In a practical embodiment the retaining of the carcass in an orientation with the neck end downwards comprises keeping legs of the carcass in a spreaded position by a spreader bracket interpositioned between the legs at the vent end of the carcass.

In an embodiment the pre-lifting tool grasps and lifts the gizzard prior to the eviscerating tool entering the body cavity, preferably said pre-lifting tool then also moving the gizzard towards the back of the carcass. The pre-lifting tool thereby creates an easy access for the eviscerating tool into the body cavity, e.g. as the pre-lifting tool may, in most cases, entrain the intestines away from the breast side of the cavity so that the eviscerating tool does not or hardly collide with the intestines. This avoids damage to intestines and may allow for increased operating speed.

The present invention also relates to a device characterized in that the device further comprises a gizzard pre-lifting tool, distinct from the eviscerating tool, and a gizzard pre-lifting tool drive, which are adapted to cause the gizzard pre-lifting tool to enter into the body cavity of the retained carcass via the opened vent end, which gizzard pre-lifting tool is operable to grasp the gizzard and/or belly fat bonded to the gizzard and which gizzard pre-lifting tool is operable to lift the gizzard thereby entraining a further portion, including the liver, of the viscera pack, wherein said gizzard pre-lifting tool drive is adapted to cause said lifting of the gizzard to be performed prior to the front end of the eviscerating tool passing along the breast side of the body cavity past the liver as the eviscerating tool is dipped into the body cavity As explained above, in an embodiment, the gizzard pre-lifting tool is embodied to maintain the grasp of the gizzard and/or belly fat bonded to the gizzard during the withdrawal of the eviscerating tool and is moved in a withdrawal motion along with the eviscerating tool.

As explained above, in an embodiment, the front end of the eviscerating tool is adapted to grasp the gullet before withdrawing the eviscerating tool, e.g. wherein the front end of the eviscerating tool is provided with a gullet clamp.

As explained above, in an embodiment the gizzard pre-lifting tool comprises a gizzard spoon that is embodied to capture the gizzard.

As explained above, in an embodiment, the gizzard pre-lifting tool comprises a clamp that is operable to clamp the gizzard and/or belly fat bonded to the gizzard. In a practical embodiment thereof the clamp of the gizzard pre-lifting tool comprises a left-hand clamp member and a right-hand clamp member, each clamp member having a front end. The gizzard pre-lifting tool drive is embodied to cause said clamp members to enter into the body cavity along the side of the gizzard facing the breast of the carcass and, preferably, to a depth wherein their front ends have passed to the lower end of or just beyond the gizzard, after which the left-hand clamp member is caused to pass along the left-hand side of the gizzard and the right-hand clamp member along the right-hand side (when seen from above) towards the back of the carcass into a clamping position relative to the gizzard. In the clamping position the clamp members have been moved towards one another such that the back portion of the gizzard and/or belly fat bonded to the gizzard is clamped between the clamp members.

In a further development thereof the clamp members are embodied such that the clamp members are spaced from one another in a clamping position thereof such that belly fat bonded to the gizzard is clamp while the spacing allows for the undamaged passage of intestine between the clamp members in the clamping position.

As explained above, in an embodiment, the gizzard pre-lifting tool comprises a member, e.g. one or more movable clamp members, that are caused to move past the gizzard during the grasping of the gizzard, e.g. during a motion of one or more clamp members towards a clamping position thereof, such that forces exerted by the one or more members during said motion on belly fat bonded to the gizzard cause said belly fat to become loosened from the gizzard and/or torn.

As explained above, in an embodiment, the retention assembly comprises a spreader bracket that is interpositioned between legs of the carcass to keep legs of the carcass in a spreaded position.

BRIEF DESCRIPTION OF THE DRAWINGS

The invention will now be explained with reference to the drawings, in which in a non-limiting manner exemplary embodiments of the invention are illustrated. In the drawings:

FIGS. 3*a*-3*j* illustrate various steps of the evisceration performed with the device of FIG. 1, FIGS. 4*a, b* illustrate the gullet clamp at the front end of the evisceration tool in opened and clamping position, FIGS. 5*a, b* illustrate the gullet clamp in the process of clamping the gullet.

DETAILED DESCRIPTION

With reference to the FIGS. 1-10 now two embodiments of a device for eviscerating slaughtered poultry according to the invention will be explained.

In these examples the poultry is a chicken, but the invention is applicable to other poultry, e.g. duck, as well.

Figure 1:
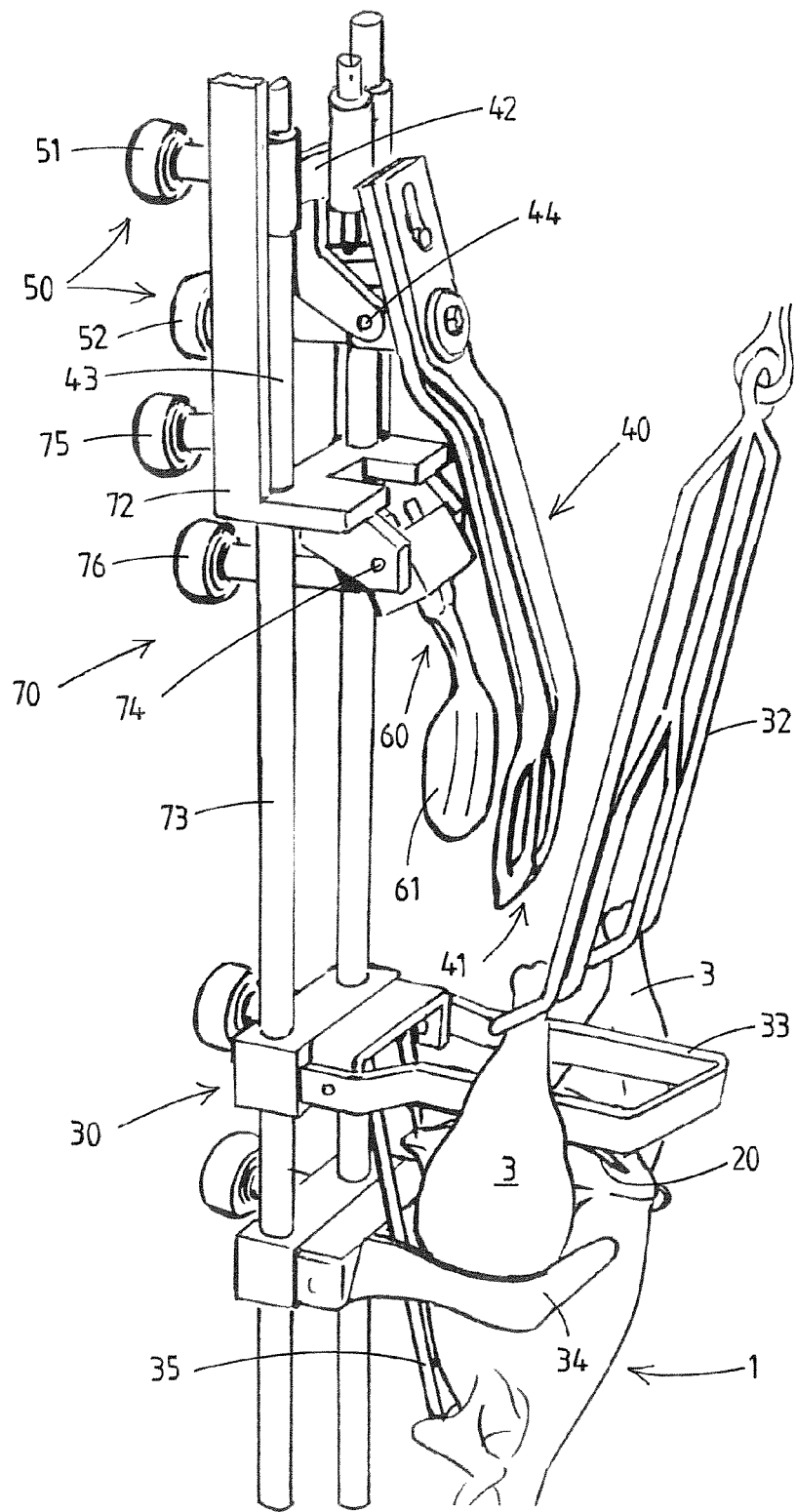
FIG. 1 shows perspective view an example of a device according to the invention and a poultry, here a chicken, to be eviscerated suspended from a conveyor shackle by its legs.

The FIG. 1 shows in side view a slaughtered and defeathered chicken 1 which is retained or suspended by its legs in a poultry shackle 2 as is known in the art.

Figure 2:
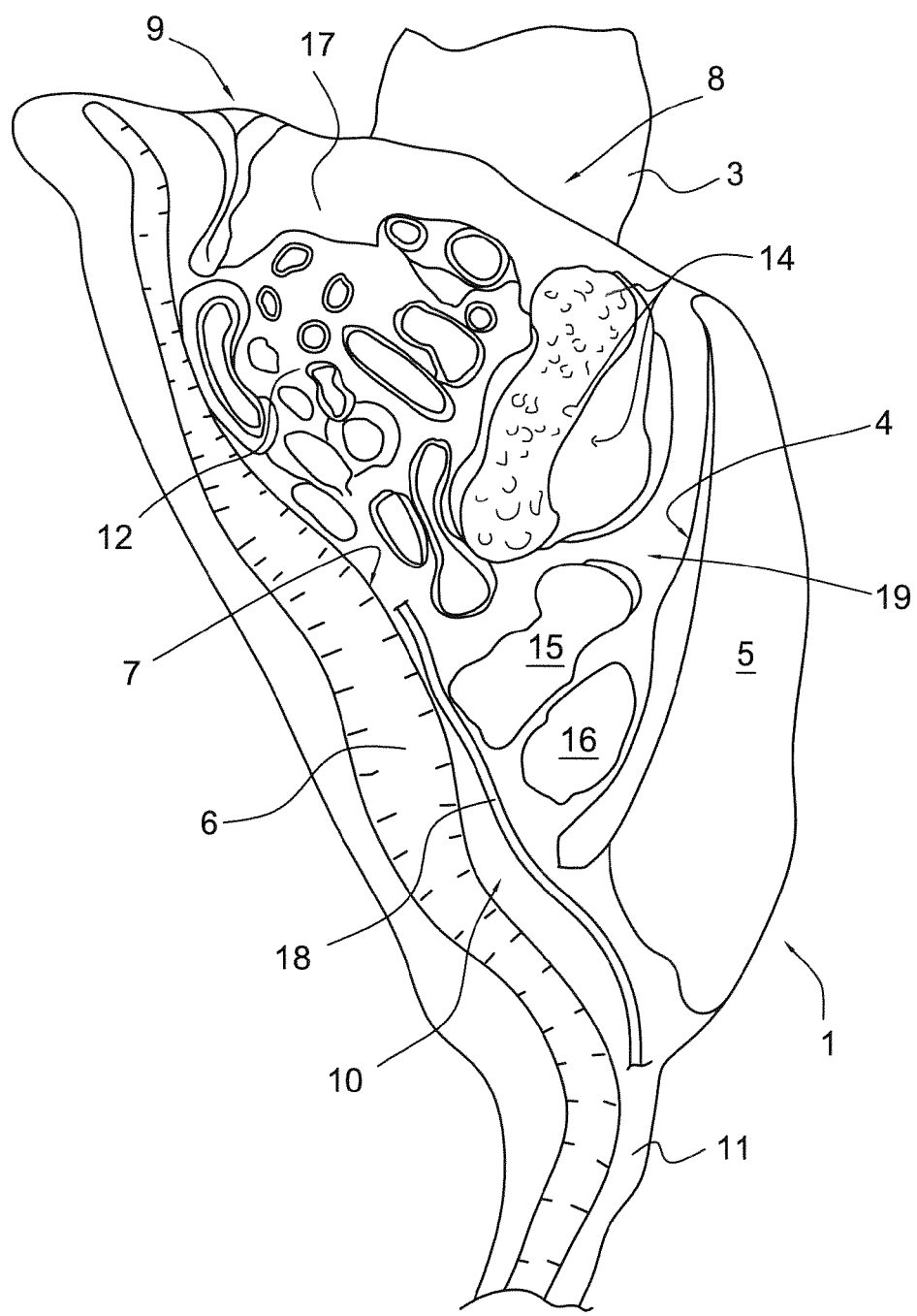
FIG. 2 illustrates in cross-section the carcass of the chicken to be eviscerated.

In order to facilitate the understanding of the present invention the FIG. 2 shows a cross-section of a slaughtered chicken 1 in neck down orientation. The FIG. 2 shows the carcass and the location within the body cavity thereof of the organs as discussed herein. The FIG. 2 has been obtained by deep-freezing a slaughtered chicken whilst suspended from its legs and cutting the frozen chicken in half.

In FIG. 2 the following parts of the chicken carcass 1 are provided with reference numerals:

leg 3,
breast side 4 of the body cavity,
breast fillet meat 5,
vertebra 6,
back side 7 of body cavity,
vent end 8 of body cavity,
vent or cloaca 9,
neck end 10 of body cavity,
neck 11
intestines 12,
gizzard 14
liver 15,
heart 16,
belly fat 17
gullet 18.

The gizzard 14 is depicted here with food remnants, e.g. of seeds, still present in the gizzard.

The entirety of the organs within the body cavity is identified as viscera pack with reference numeral 19.

The carcass has the viscera pack 19 in the body cavity of the carcass 1. The carcass has a breast 5 at the right-hand side of the FIGS. 1 and 2 as the back of the carcass is directed towards the device. The body cavity has a breast side 4 and a back side 7, in FIGS. 1, 2, and 3 corresponding to the right-hand side and the left-hand side of the cavity.

As can be seen the chicken is retained in a neck down orientation, so that the vent end 8—where the vent 9 is or was located—is at the top of the body cavity and the neck end 10 at the lower end of the body cavity.

The FIG. 2 shows the carcass 1 with the vent end side still closed. As is common in the art the body cavity will be opened at the vent end, e.g. by an upstream vent opening device prior to the start of the evisceration process. This vent opening 20 is partly visible in FIG. 1.

The device 30 comprises a retention assembly adapted to retain the carcass 1 in an orientation with the neck end downwards. Here the retention assembly includes the poultry shackle 32, as well as, optionally, one or more of a leg spreader bracket 33, lateral stabilizers 34 that engages on sides of the chicken, and a back support bracket 35 supporting the back of the carcass. The retention assembly may have different embodiments.

The device 30 further comprises an eviscerating tool 40 and an eviscerating tool drive 50, e.g. as known from the prior art.

In the example shown here the eviscerating tool 40 is embodied generally as shown in WO01/52659 including a gullet clamp 41 at the front end of the tool 40. The rear or upper end of the tool 40 is connected to a tool carrier 42 of the tool drive that is movable up and down along a guide structure 43 of the device. The tool 40 here is pivotally connected to the carrier 42 about a horizontal pivot 44 to allow for a pivotal motion of the tool 40 towards and away from the back of the carcass.

In a practical embodiment both the up and down motion as well as the pivotal motion of the tool 40 are controlled by cam track mechanism of the tool drive, here with cam track follower 51 for the up and down motion and cam track follower 52 for the tilting motion of the tool 40. A further (not shown) cam track follower may be provided to control the operation of the clamp 41.

The device 30 is preferably integrated in a carousel machine having multiple such devices 30 around its circumference.

The combination of an up and down motion as well as of a tilting motion of the tool 40 for example, as in the prior art, allows for a path during dipping the tool 40 deep into the body cavity that more or less follows the contour of the breast side 4 of the body cavity as well as allows for a motion of the gullet clamp 41 towards the section of the gullet 18 to be clamped as will be explained below.

As is known in the art the eviscerating tool 40 and eviscerating tool drive 50 are adapted to cause the eviscerating tool 40 to enter the body cavity of the retained carcass 1 via the opened vent end 8 and to dip the eviscerating tool 40 deeper into the body cavity with its front end passing along the breast side 4 of the body cavity so that the front end thereof moves past the viscera pack 19 at least till beyond the liver 15, preferably till the gullet clamp is at the height of the gullet section 18 to be clamped, e.g. just below the heart 16.

As is known in the art the eviscerating tool drive 50 is further adapted to withdraw the eviscerating tool 20, here after clamping the gullet by means of gullet clamp 41, and thereby lift the viscera pack 19 out of the body cavity.

Figures 4A, 4B:
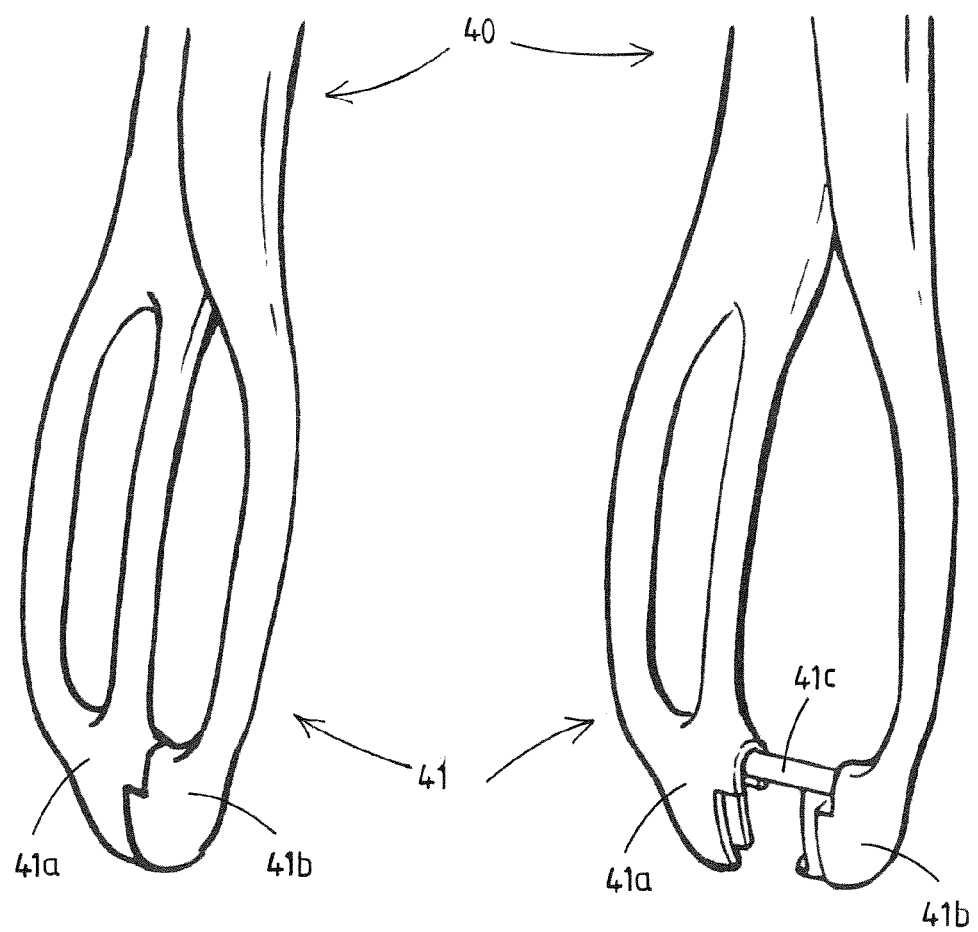

The front end of the tool 40 provided with the gullet clamp 41 is, by way of example, illustrated in FIGS. 4a, 4b. Herein it can be seen that the gullet clamp 41 has two jaw parts 41a, b that are movable on command between an opened position (FIG. 4b) and a closed position (FIG. 4a). In the latter position, the front end preferably has a closed contour with rounded and smooth faces so that the front end in said closed position presents no sharp edges or the like that may cause damage to any organs when introduced into the body cavity.

As can be seen in this example a barrier rod 41c extends across the opening between the jaw parts 41a, b when in opened position, the rod 41c being connected to one of said jaw parts (here part 41b) and being received in a cavity in the other jaw part. The rod 41c serves to properly position the gullet 18 between the jaw parts 41a, b prior to clamping the gullet 18.

The device further comprises a gizzard pre-lifting tool 60 that is distinct from the eviscerating tool 40 as well as a gizzard pre-lifting tool drive 70.

The tool 60 and associated drive 70 are adapted to cause the gizzard pre-lifting tool 60 to enter into the body cavity of the retained carcass 1 via the opened vent end 8. The gizzard pre-lifting tool is operable to grasp the gizzard 14.

The tool 60 is arranged "inside of the eviscerating tool" which here means closer to the back of the carcass than the tool 40.

In the example shown in FIG. 1 the gizzard pre-lifting tool 60 comprises a gizzard spoon 61 that is embodied as a rigid member devoid of any mobile parts and is shaped to target and capture the gizzard 14.

The tool 60 is fitted at its rear or upper end to a tool carrier 72 of the tool drive 70 that is movable up and down along a guide structure 73 of the device. The tool 60 here is pivotally connected to the carrier 72 about a horizontal pivot 74 to allow for a pivotal motion of the tool 60 towards and away from the back of the carcass.

In a practical embodiment both the up and down motion as well as the pivotal motion of the tool 60 are controlled by cam track mechanism of the tool drive 70, here with cam track follower 75 for the up and down motion and cam track follower 76 for the tilting motion of the tool 60.

If desired the combination of an up and down motion as well as of a tilting motion of the tool 60 allows for one or more curved sections in the trajectory of the tool 60.

The gizzard pre-lifting tool 60 is operable to lift the gizzard 14 thereby entraining a further portion, including the liver 15 and the heart 16, of the viscera pack, e.g. as will be explained with reference to FIG. 3.

The gizzard pre-lifting tool drive 70 is adapted to cause the lifting of the gizzard 14 to be performed prior to the front end 41 of the eviscerating tool 40 passing along the breast side 7 of the body cavity past the liver 15 and the heart 16 as the eviscerating tool is dipped deep down into the body cavity.

In a preferred embodiment, as shown here, the lifting of the gizzard 14 by tool 60 is combined with a displacement of the gizzard 14 towards the back of the carcass to enhance entry of the eviscerating tool 40 for motion thereof along the breast side of the cavity.

With reference to FIGS. 3a-j now the operation of the device 10 illustrated in FIG. 2 on carcass 1 with opened vent end will be discussed.

In FIG. 3a the carcass 1 is retained as shown in FIG. 1. The tools 40, 60 are still outside of the body cavity, e.g. in a starting position of the tools 40, 60 for the evisceration process. It is illustrated that the vent end of the carcass has been opened, e.g. by an upstream vent opening device, here with a part of the intestine, e.g. including the cloaca, overhanging the upper edge of the body cavity, here at the rear side of the carcass.

In FIG. 3b it is illustrated that both tools 40, 60 are moved towards the opened vent end of the body cavity, with the front end of the eviscerating tool 40 being brought just into the entry of the body cavity at the breast side 7 of the body cavity. The front end of the tool 60 is close to the tool 40 as it is envisaged that the tool 40 will enter into the body cavity to pass at the breast side of the gizzard 14.

The pre-lifting tool 60 is further advanced to reach the front end of the eviscerating tool 40 and together the tools 40, 60 are moved into the body cavity to reach a shallow depth therein with both tools 40, 60 being moved to pass downwards along the breast side of the gizzard 14. This shallow depth may be seen such as the front end of the tool 60 reaching the bottom (in this upside down arrangement of the carcass) of the gizzard 14, above the liver 15. This is depicted in FIG. 3c.

The FIGS. 3d, 3e depict that the eviscerating tool 40 is not advanced downward (as it would otherwise prematurely advance along the liver 15). The pre-lifting tool 60 is now pivoted towards the back of the body cavity and thereby captures the gizzard 14 as well as moves the gizzard away from the breast side 4 of the body cavity. The tool 60 is also moved upwards, see FIG. 3e, so that the captured gizzard 14 is lifted and entrained portion of the viscera pack, including the liver and the heart, are lifted as well. In FIGS. 3a, e these motions towards the back of the cavity as well as the lifting motion are shown as being done consecutively but one will appreciated that a combined motion, leading to a more curved trajectory, is also possible.

In FIG. 3e it is depicted that some of the intestines are now raised above the vent opening of the carcass 1. The gizzard 14 may still be within the body cavity, close to the rear side, in this position.

In FIG. 3e it is also shown that the liver and heart have also been moved away from the breast side of the cavity as well as having been lifted away from the neck end, so that basically a clearance is created for the eviscerating tool 40 allowing this tool 40 to reach the gullet 18 below the heart without damaging the liver and/or heart.

FIG. 3f illustrates that the tool 40 has been advanced deep down into the body cavity so that its front end provided here with the clamp 18 finds itself in the region of the section of the gullet 18 that is to be clamped. It is envisaged that once at this depth, the clamp 41 is opened and the tool 40 is moved, here tilted with the clamp 41 towards the gullet 18, so that the gullet 18 comes in between the clamping jaws 41a, 41b. Then the clamp 41 is closed so that the gullet 18 is securely retained. This is depicted in FIGS. 5a, 5b.

With the gullet 18 clamped the tool 40 as well as the tool 60 are raised in a withdrawal motion, with the tools moving the viscera pack completely out of the body cavity. As can be seen, in this example, the gizzard is not held in a firm grasp by the spoon 61 as it is no longer supported by the back of the carcass once the gizzard reaches the upper end of the body cavity. So the spoon 61 slides along the viscera pack. The clamp 41 however does remain its firm lock on the gullet 18.

Once the carcass 1 is moved away, or the tool 40 raised even further, the viscera pack becomes suspended from the clamp 41 as shown in FIG. 3i. The clamp 41 may then be opened to release the viscera pack, e.g. allowing it to drop as shown in FIG. 3j, e.g. onto a viscera pack conveyor (now shown).

Figure 6:
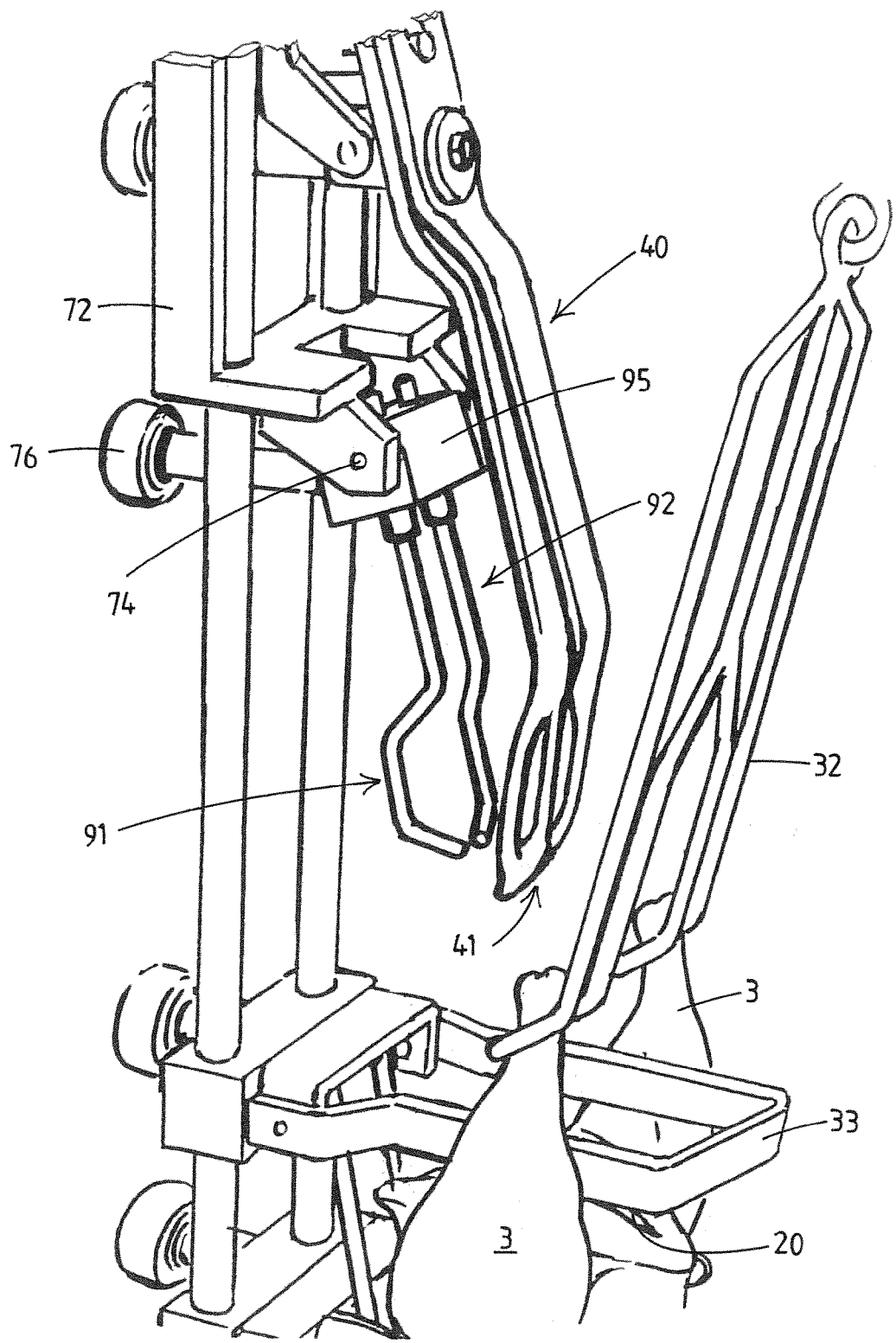
FIG. 6 shows in perspective view another example of a device according to the invention and a poultry, here a chicken, to be eviscerated suspended from a conveyor shackle by its legs.

With reference to FIG. 6 now a second example of the device for eviscerating slaughtered poultry according to the invention will be explained. In this device 10' the spoon 61 has been replaced by a gizzard pre-lifting tool 90 that comprises a clamp that is operable to clamp the gizzard 14 and/or belly fat bonded to the gizzard.

The clamp of the gizzard pre-lifting tool 90 comprises a left-hand clamp member 91 and a right-hand clamp member 92, each clamp member 91, 92 having a front or lower end.

The clamp members 91, 92 are mounted via a stem mounting body 95 on the carrier 72 of the drive 70. The carrier 72 is movable up and down along guide structure 73 of the device. As explained above a cam track mechanism causes the desired up and down motion of the carrier 72 and thereby of the body 95 supporting the clamp members 91, 92. The body 95 is pivotal about horizontal axis 74 relative to the carrier 72, here with cam track follower 75 being connected to body 95.

Each of the clamp members 91, 92 comprises a stem 91a, 92a that is rotatable about is longitudinal axis, the stem being mounted via a bearing in a stem mounting body 95. At the lower end of the stem each clamp member 91, 92 has a C-shaped clamp section 91b, 92b, with the end of the top portion of the C-shaped section connecting to the lower end of the respective stem.

The drive 70 is further adapted, e.g. by means of a further cam track, to perform a controlled rotation of each clamp member 91, 92 about the longitudinal axis of the respective stem 91a, 92a, so that the C-shaped clamp sections 91b, 92b can be brought in various positions. For example a cam track mechanism is provided to control said rotary motion of the clamp members 91, 92.

The stem mounting body 95 is pivotally connected to the carrier 72 via a horizontal pivot 74 allowing the pivoting of the tool 90, e.g. in order to pass the clamp members 91, 92 along opposed sides of the gizzard 14 in the clamping process as will be explained below. The pivoting motion of the tool 90 can be controlled by a cam track mechanism.

Figure 7:
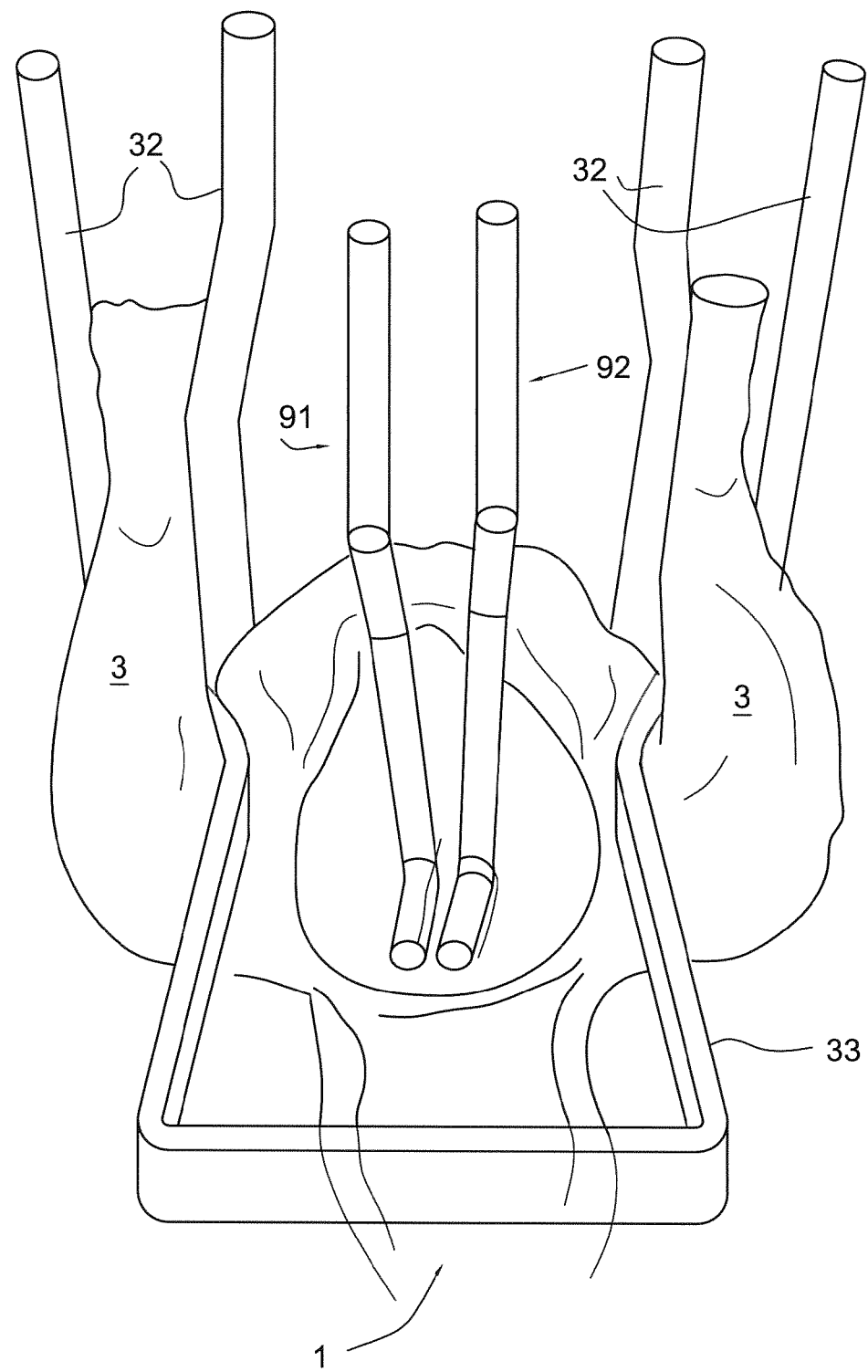
FIG. 7 illustrates the entry of the gizzard pre-lifting tool of FIG. 6 into the body cavity.

In FIG. 7 it is illustrated that prior to entry into the body cavity the clamp members 91, 92 are in a closed position, preferably with the lower portions of the C-shaped sections closely adjacent one another, e.g. enhancing entry of the tool 90 in between the intestines 12.

As explained the gizzard pre-lifting tool drive 70 is embodied to cause the clamp members 91, 49 to enter into the body cavity along the side of the gizzard 14 that faces the breast of the carcass.

Figure 8:
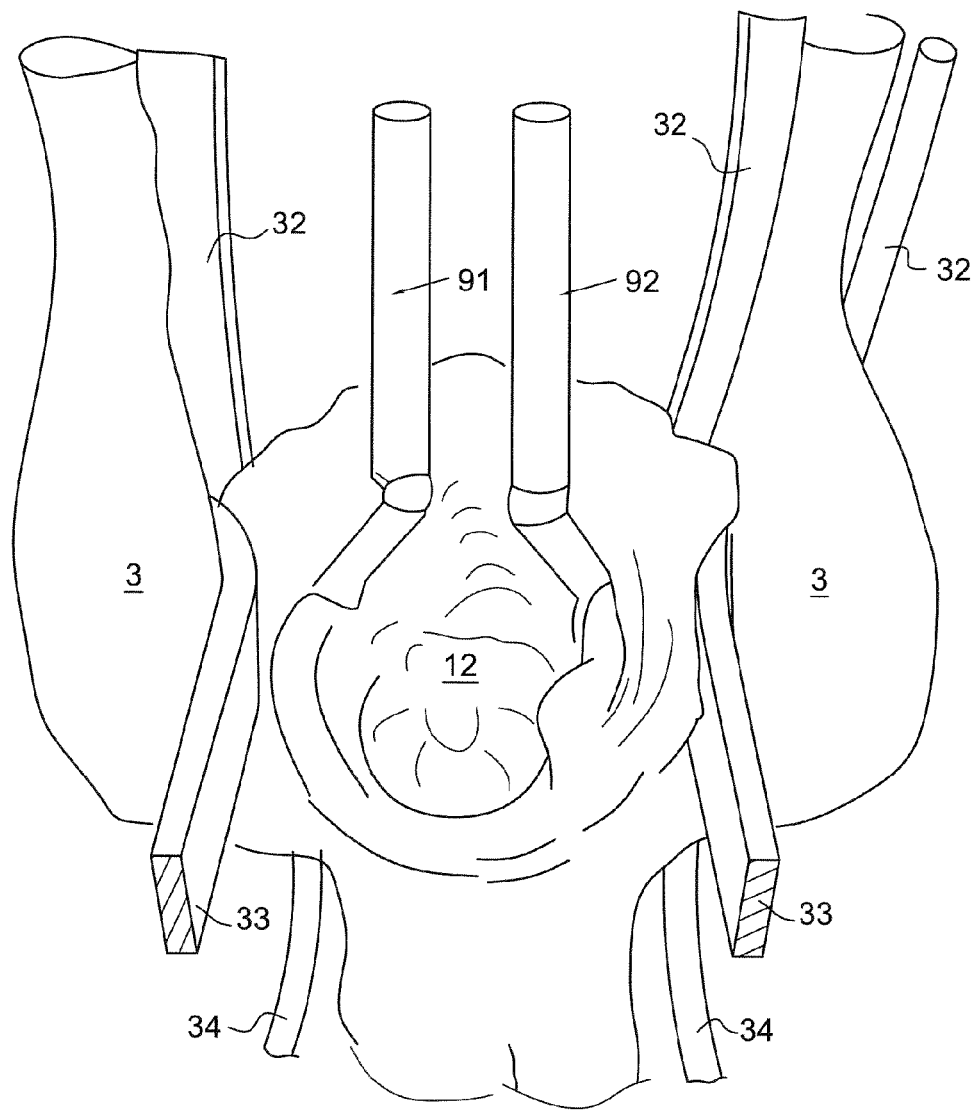
FIG. 8 illustrates the passing of the left-hand and right-hand clamp members of the gizzard pre-lifting tool of FIG. 6 along the respective sides of the gizzard which is not visible here.

As illustrated in FIG. 8 the tool 40 is introduced into the body cavity to a shallow depth, passing through the layer of intestines to a depth where the front ends of the clamp members 91, 92 have just reach beyond the gizzard 14, e.g. to just below the gizzard.

As can be seen from comparison of FIGS. 7 and 8, the clamp members 91, 92 are rotated about the axis of their stems 91a, 92a so that the central portions of the C-shaped sections move apart, at least to a distance that allows the undamaged passage of the gizzard 14 in between said central portions. Also, here by pivoting the tool 60, the clamp members 91, 92 are moved towards the back of the carcass, so that the left-hand clamp member 91 is caused to pass along the left-hand side of the gizzard 14 and the right-hand clamp member 92 along the right-hand side (when seen from above) towards the back of the carcass into a clamping position relative to the gizzard.

As can be seen the intestines 12 do not hinder said motion of the clamping members 91, 92. The gizzard 14 is hidden from view as it is located beneath some of the layer of intestines.

The FIG. 8 shows the clamp members 91, 92 in a position wherein their central portions are located on opposite sides of the gizzard 14, with the angled front end portions near the bottom of the gizzard when seen in this neck down orientation. In this example it is depicted that in this clamping position of the members 91, 92 sufficient hold on the gizzard 14 is created to perform the desired pre-lifting. As can be seen the clamp members 91, 92 are, in this example, embodied such that the clamp members are spaced from one another in a clamping position thereof such that belly fat bonded to the gizzard is clamped while the spacing allows for the undamaged passage of intestine between the clamp members in the clamping position.

Figure 9:
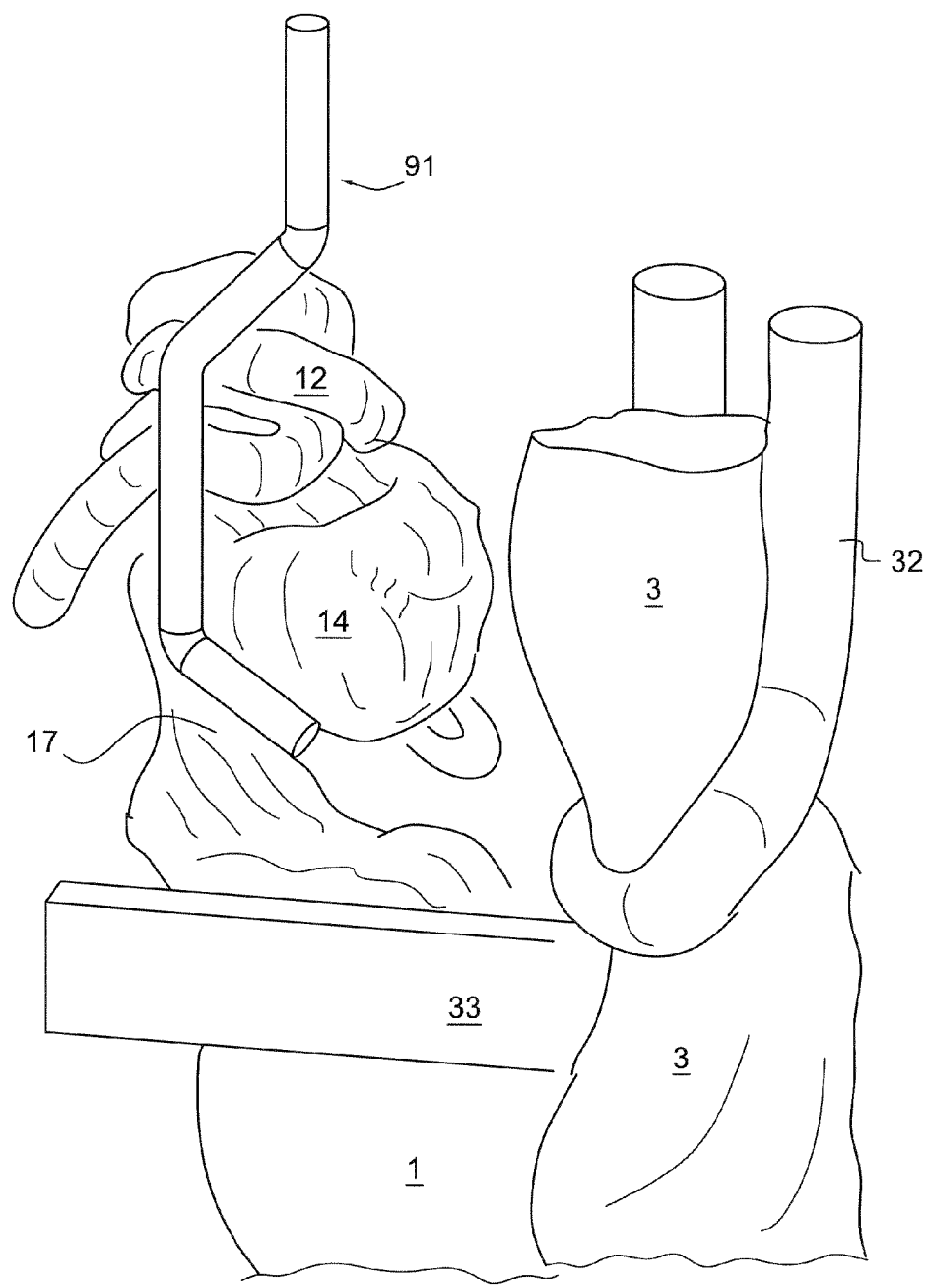
FIG. 9 illustrates the situation wherein the gizzard has been lifted and moved to the back of the carcass by the gizzard pre-lifting tool, showing the gizzard.

Once the gizzard 14 and/or bonded belly fat 17 is grasped by the tool 90, the drive 70 thereof causes the tool 90 and thereby the gizzard and entrained portion of the viscera pack to be pre-lifted to a position, which is shown in FIG. 9. As shown there the pre-lifted position can be with the gizzard 14 just outside of the vent side opening but this position could also be with the gizzard still (partly) within the body cavity or even further out of the cavity then shown here. In practical embodiments the pre-lifting is limited by the desire not to overly strain the digestive tract between the gizzard and the portion of the digestive tract that may still be strongly attached to the carcass, e.g. via the crop.

The operation of the tool 60, 90 also caused displacement of the gizzard from its original position within the body cavity towards the back, so away from the breast side of the cavity as can also be seen in FIG. 3e by the presence of a cleared entry into the body cavity for the eviscerating tool 40 at the breast side of the cavity.

In practice the pre-lifting, preferably combined with backward displacement, of the gizzard 14 causes the liver 15 and also the heart to be pulled away from the breast side wall of the body cavity. As explained here this facilitates the later passage of the eviscerating tool 40 past the liver 15 and the heart 16 down to the neck end of the cavity without damaging the liver or at least with a significant reduction of liver damage occurrence.

Once the gizzard 14 has been pre-lifted by the tool 60, 90 the eviscerating tool 40 is dipped deep into the body cavity passing along the breast side of the cavity and past the liver, preferably also past the heart, e.g. so that the clamp 41 at the front end thereof can clamp the gullet, e.g. at a location just above the crop. In embodiment the front end can be introduced already to a very shallow depth into the body cavity ahead of the gizzard pre-lifting tool being operated to lift the gizzard. The front end of the tool 40 is however only made to dip past the fragile liver 15 once the tool 60, 90 has performed the pre-lifting step of the gizzard 14 to avoid undue liver damage.

In order to completely withdraw the viscera pack from the body cavity it is envisaged that both the eviscerating tool 40, here clamping the gullet and supporting the viscera pack from underneath, and the gizzard pre-lifting tool 90, maintaining its grasp of the gizzard and/or bonded belly fat, are moved in unison in a withdrawal motion so that the entire viscera pack is removed from the carcass 1.

The use of a gizzard pre-lifting tool 91, 92 may, in a suitable design and operation of the tool, also be employed to cause belly fat bonded to the gizzard 14 to become loosened from the gizzard to which it is naturally rather strongly bonded.

This loosening, e.g. by locally tearing belly fat close to the gizzard and/or tearing the bond with the gizzard, may be deliberately caused during the process of grasping of the gizzard, e.g. as the clamp members 91, 92 are being passed along opposite sides of the gizzard.

The loosening may also be achieved, or progressed, passing clamp members along opposite sides of the gizzard from the breast facing side thereof to the back facing side thereof, and the pinching by means of the clamp members 91, 92 the belly fat at the back side of the gizzard so that it is strained and will rupture and/or release from the gizzard. This pinching effect of the belly fat can be achieved, if desired, after the pre-lifting step of the gizzard, or even after the step of withdrawal of the viscera pack from the body cavity by means of both the pre-lifting tool and the evisceration tool.

In an embodiment it is envisaged that the pre-lifting tool 91,92 is embodied to maintain a grasp on the gizzard or bonded belly fat after the pre-lifting step, wherein in a further step a pulling action is performed wherein the belly fat is strained and will rupture and/or become loose from the gizzard. For example the pre-lifting tool is embodied to pinch belly fat bonded to the gizzard and the gizzard is then pulled away so that the desired loosening of belly fat from the gizzard is achieved. For example use is made of an additional gizzard stop member, with the pre-lifting tool performing a motion relative to said gizzard stop member so that the gizzard is withheld by said stop member and thus the mentioned pull action is performed. For example the stop member is arranged in mobile manner, so as to be movable between a retracted position and an active position. In another embodiment the gizzard stop member is formed on or by the evisceration tool, e.g. by the front end of the evisceration tool, wherein said front end is used to pressed the gizzard away from the pre-lifting tool that retains the belly fat.

One can also envisage that the pre-lifting tool retains its grasp of the gizzard after pre-lifting and brings the gizzard in the vicinity of a belly fat cutter that cuts into or through the belly fat, preferably adjacent the gizzard so as to retain as much belly fat on the carcass as possible.

The provision of a gizzard pre-lifting tool may, in a suitable embodiment, this be used to cause a loosening of belly fat from the gizzard. For example, one or more of the clamp members 91, 92 of the pre-lifting tool may be embodied as a sort of scraper that scrape(s) along the exterior of the gizzard to loosen the belly fat from the gizzard. A main advantage of this effect is that more belly fat is retained on the carcass which adds to the weight of the carcass. A further advantage is that the weakening of the connection formed by the belly fat between the gizzard 14 and the rest of the carcass enhances the proper evisceration, e.g. reduces the required forces, allows for greater operating speed, etc.

The invention claimed is:

1. A method for eviscerating slaughtered poultry having a carcass with a viscera pack in a body cavity of the carcass, said body cavity having a breast side and a back side, and a vent end where the vent is or was located and a neck end, wherein the body cavity has been opened at the vent end, the method comprising the steps of:

retaining the carcass in an orientation with the neck end downwards;

entering the body cavity of the retained carcass with an eviscerating tool via the opened vent end, said eviscerating tool having a front end;

dipping the eviscerating tool deeper into the body cavity with a front end thereof passing along the breast side of the body cavity so that the front end thereof moves past the viscera pack at least till beyond the liver;

withdrawing the eviscerating tool and thereby lifting the viscera pack out of the body cavity; and using a gizzard pre-lifting tool, distinct from the eviscerating tool, which is entered into the body cavity of the retained carcass via the opened vent end, which gizzard pre-lifting tool is operated to grasp the gizzard and/or belly fat bonded to the gizzard and which gizzard pre-lifting tool is operated to lift the gizzard thereby entraining a further portion of the viscera pack including the liver, said lifting of the gizzard being performed prior to the front end of the eviscerating tool passing along the breast side of the body cavity past the liver as the eviscerating tool is dipped into the body cavity.

2. The method according to claim 1, wherein the gizzard pre-lifting tool is operated to lift the gizzard and also to displace the gizzard away from the breast side of the body cavity of the carcass.

3. The method according to claim 1, wherein, during the withdrawal of the eviscerating tool, the gizzard pre-lifting tool is moved in a withdrawal motion along with the eviscerating tool thereby further lifting the gizzard and entrained portion of the viscera pack, the pre-lifting tool being embodied and operated to maintain the grasp of the gizzard and/or belly fat bonded to the gizzard during said motion.

4. The method according to claim 1, wherein the front end of the eviscerating tool grasps the gullet before withdrawing the eviscerating tool, and wherein the front end of the eviscerating tool is provided with a gullet clamp.

5. The method according to claim 1, wherein the gizzard pre-lifting tool comprises a gizzard spoon embodied to capture the gizzard, which gizzard spoon is entered into the body cavity at the breast side of the gizzard and is then moved towards the back of the body cavity and lifted to capture and lift the gizzard, thereby entraining the further portion of the viscera pack.

6. The method according to claim 5, wherein the gizzard spoon is a rigid member that is shaped so as to capture the gizzard.

7. The method according to claim 1, wherein the gizzard pre-lifting tool is employed to cause belly fat bonded to the gizzard to become loosened from the gizzard and/or torn.

8. The method according to claim 1, wherein, during the withdrawal of the eviscerating tool, the gizzard pre-lifting tool is moved in a withdrawal motion along with the eviscerating tool thereby further lifting the gizzard and entrained portion of the viscera pack.

9. The method according to claim 1, wherein the front end of the eviscerating tool grasps the gullet before withdrawing the eviscerating tool.

10. A device for eviscerating slaughtered poultry having a carcass with a viscera pack in a body cavity of the carcass, said body cavity having a breast side and a back side, and a vent end where the vent is or was located and a neck end, wherein the body cavity has been opened at the vent end, the device comprising:

a retention assembly adapted to retain the carcass in an orientation with the neck end downwards;

an eviscerating tool and an eviscerating tool drive, which are adapted to cause the eviscerating tool to enter the body cavity of the retained carcass via the opened vent end, said eviscerating tool having a front end, and to dip the eviscerating tool deeper into the body cavity with a front end thereof passing along the breast side of the body cavity so that the front end thereof moves past the viscera pack at least till beyond the liver;

wherein the eviscerating tool drive is further adapted to withdraw the eviscerating tool and thereby lift the viscera pack out of the body cavity, and wherein the device further comprises a gizzard pre-lifting tool, distinct from the eviscerating tool, and a gizzard pre-lifting tool drive, which are adapted to cause the gizzard pre-lifting tool to enter into the body cavity of the retained carcass via the opened vent end, which gizzard pre-lifting tool is operable to grasp the gizzard and/or belly fat bonded to the gizzard and which gizzard pre-lifting tool is operable to lift the gizzard thereby entraining a further portion of the viscera pack including the liver, wherein said gizzard pre-lifting tool drive is adapted to cause said lifting of the gizzard to be performed prior to the front end of the eviscerating tool passing along the breast side of the body cavity past the liver as the eviscerating tool is dipped into the body cavity.

11. The device according to claim 10, wherein the gizzard pre-lifting tool drive is adapted to lift the gizzard and also to displace the gizzard away from the breast side of the body cavity of the carcass.

12. The device according to claim 10, wherein the gizzard pre-lifting tool drive is adapted to move the gizzard pre-lifting tool in a withdrawal motion along with the withdrawal of the eviscerating tool thereby further lifting the gizzard and entrained portion of the viscera pack, the pre-lifting tool being embodied and operated to maintain the grasp of the gizzard and/or belly fat bonded to the gizzard during said motion.

13. The device according to claim 10 wherein the front end of the eviscerating tool is adapted to grasp the gullet before withdrawing the eviscerating tool, and wherein the front end of the eviscerating tool is provided with a gullet clamp.

14. The device according to claim 10, wherein the gizzard pre-lifting tool comprises a gizzard spoon embodied to capture the gizzard, wherein the gizzard pre-lifting tool drive is adapted to enter the gizzard spoon into the body cavity at the breast side of the gizzard and then move the gizzard spoon towards the back of the body cavity and to lift the gizzard spoon in order to capture and lift the gizzard, thereby entraining the further portion of the viscera pack.

15. The device according to claim 14, wherein the gizzard spoon is a rigid member that is shaped so as to capture the gizzard.

16. The device according to claim 10, wherein the gizzard pre-lifting tool comprises one or more movable clamp members, that are caused to move past the gizzard during the grasping of the gizzard, during a motion of the one or more movable clamp members towards a clamping position thereof, such that forces exerted by the one or more movable clamp members during said motion on belly fat bonded to the gizzard cause said belly fat to become loosened from the gizzard and/or torn.

17. The device according to claim 10, wherein the retention assembly comprises a spreader bracket that is interpositioned between legs of the carcass to keep legs of the carcass in a spreaded position.

18. The device according to claim 10, wherein the gizzard pre-lifting tool drive is adapted to move the gizzard pre-lifting tool in a withdrawal motion along with the withdrawal of the eviscerating tool thereby further lifting the gizzard and entrained portion of the viscera pack.

19. The device according to claim 10 wherein the front end of the eviscerating tool is adapted to grasp the gullet before withdrawing the eviscerating tool.

20. The device according to claim 10, wherein the gizzard pre-lifting tool comprises a member that is caused to move past the gizzard during the grasping of the gizzard, such that forces exerted by the member during said motion on belly fat bonded to the gizzard cause said belly fat to become loosened from the gizzard and/or torn.

* * * * *